Patented Apr. 7, 1936

2,036,705

UNITED STATES PATENT OFFICE 2,036,705

PYRIDINO COMPOUNDS

Max Albert Kunz, Mannheim, and Karl Koeberle and Gerd Kochendoerfer, Ludwigshafen-on-the-Rhine, Germany, assignors to General Aniline Works, Inc., New York, N. Y., a corporation of Delaware No Drawing. Application June 19, 1930, Serial No. 462,412. In Germany June 21, 1929

12 Claims. (Cl. 260—40)

The present invention relates to the production of high molecular pyridino compounds.

We have found that new very valuable compounds containing nitrogen as a member of a ring, which hereinafter are referred to as high molecular pyridino compounds, are obtained by condensing cyclic amino compounds containing a system of more than 3 condensed rings, at least one ortho-position to the amino group or groups being occupied by hydrogen or any other group readily split off, with compounds containing at least 3 carbon atoms in an open unbranched chain in a diluting medium in the presence of agents capable of splitting off the elements of water and of dehydrogenating agents. The compounds with which the cyclic amino compounds are to be condensed, may be defined as compounds which according to known methods yield quinolines by condensation with aromatic amines, such as for example glycerine, methylene acetone ($CH_3.CO.CH=CH_2$), acetaldehyde under conditions suitable for the aldol condensation, cinnamic aldehyde, propionic aldehyde and similar compounds. Particularly useful for the condensation are glycerine, its substitution products, for example methylglycerine, and its derivatives, such as epichlorhydrine. As diluting medium organic solvents, for example benzene and its derivatives, such as chlorobenzenes and nitrobenzenes, and preferably inorganic acids, such as sulphuric acid and phosphoric acid, may be employed. In case the condensation is carried out in sulphuric acid or phosphoric acid the addition of agents splitting off the elements of water may be dispensed with. It is advantageous to employ sulphuric acid of from about 85 to 95 per cent strength as diluting and condensing agent since the pyridino compounds separate out from the said sulphuric acid in the form of their sulphates which after separation and decomposition by means of water yield the pyridino compounds in a particularly pure form. Dehydrogenating agents which may be added comprise nitro compounds, in particular nitrobenzene, nitrobenzenesulphonic acids and nitrotoluenesulphonic acids, arsenic acid, hydrogen peroxide, persulphuric acid, ferric salts and the like. When employing sulphuric acid as diluting and condensing agent it is not necessary but advantageous to add a dehydrogenating agent, since sulphuric acid itself acts as dehydrogenating agent. Since nitro compounds can generally be used as dehydrogenating agents also the nitro compounds of the cyclic amino compounds which are subjected to condensation, may be used as dehydrogenating agents and since the mixture of glycerine and sulphuric acid preferably employed for the condensation, has a reducing action it is also possible to start from cyclic nitro compounds instead of from the corresponding amino compounds, a part of the nitro compounds being reduced to amino compounds entering into reaction, the remainder serving as dehydrogenating agent. Instead of the cyclic amino compounds also such derivatives thereof as react like the free amino compounds may be used as starting material, for example the corresponding acylamino compounds or azomethines. Cyclic amino compounds suitable for the purpose of our invention are, for example, the amino derivatives of benzanthrones, pyrazolanthrones, the amino compounds of the various dianthrones, such as for example ms-benzdianthrones, ms-naphthodianthrones, allo-ms-naphthodianthrones, ms-anthradianthrones, pyranthrones, anthanthrones, or of anthraquinoneacridones, anthraquinonecarbazoles, anthraquinoneazines as well as of perylenequinones, pyrenequinones, as for example of 3.4.8.9-dibenzopyrene-5.10-quinones or 4.5.8.9-dibenzopyrene-3.10-quinones.

The reaction products obtained in very good yields are most probably of a quinoline-like structure, they are therefore pyridino compounds of the cyclic compounds employed as initial material and accordingly from the initial materials containing a single reactive amino group, monopyridino derivatives and from those initial materials containing several such amino groups di- and poly-pyridino derivatives are obtained.

The pyridino derivatives of initial materials which by further condensation, as for example caustic alkali fusion or treatment with concentrated sulphuric acid or aluminium chloride, are converted into higher molecular compounds, may also be converted in an analogous manner into higher molecular reaction products by further condensation. Thus for example the pyridino compounds of benzanthrones which in the Bz1- or Bz2-position respectively contain hydrogen, halogen or hydroxy groups yield by alkaline condensation pyridino-derivatives of dibenzanthrone and isodibenzanthrone respectively; likewise the pyridino compounds of pyrazolanthrones yield pyridino compounds of dipyrazolanthronyls, the pyridino compounds of ms-benz- and allo-ms-naphthodianthrones yield by a treatment with aluminium chloride or by oxidation in an acid medium the pyridino compounds of ms-naphtho- and ms-anthradianthrones respectively.

The properties of the pyridino compounds and condensation products thereof obtained in the aforedescribed manner can be varied within wide limits by halogenation, nitration and sulphonation. Thus for example halogenated pyridino compounds may be obtained by the action of halogen or halogenating agents. By the simultaneous or consecutive action of different halogens or halogenating agents supplying such different halogens, chlorobromo, chloroiodo and like derivatives may be obtained. The nitro-derivatives obtainable for example by the action of nitric acid on the said pyridino derivatives may be reduced to the corresponding amino compounds in which one or both hydrogen atoms of the amino group or groups may be replaced by any organic radicles for example by condensation of the said amino compounds with organic compounds containing a reactive halogen atom, such as for example halogenated aliphatic or aromatic compounds. The amino group or groups may also be wholly or in part replaced by other radicles, such as for example halogens, cyano-, thiocyano or hydroxy groups. By the action of oleum the corresponding sulpho derivatives are obtained. The properties of the substituted pyridino derivatives vary according to the kind of substituent introduced; generally speaking by the introduction of the substituents the properties of the pyridino compounds change in the same manner as do the properties of cyclic compounds from which the pyridino derivatives are obtained.

As has been stated above the pyridino compounds of cyclic compounds which are themselves capable of further condensation, may also be subjected to such condensation, for example pyridino dibenzanthrones and pyridino dipyrazolanthronyls being thus obtainable by alkaline or acid condensation from pyridino benzanthrones and pyridino pyrazolanthrones. Similar condensation may also be carried out with the substituted pyridino derivatives obtainable as aforedescribed.

The condensation products which are usually obtained in nearly theoretical yields, may be purified if necessary according to the usual methods as for example by crystallization, sublimation, purification by way of their salts such as by way of their oxonium or ammonium salts, or by treatment with oxidizing agents as for example in the form of their aqueous pastes with alkali metal hypochlorites. According to their constitution they are valuable intermediate or final products for the dyestuff and pharmaceutical industries. Thus some of the new products, especially when they contain several heterocyclic rings or amino groups, dye wool even from acid solutions. When groups suitable for vatting are present in the new products they usually dye the vegetable fibre powerful shades from alkaline vats. Such products furnish leuco compounds, as for example leuco esters, according to known methods. The products may also be employed in part as pigment dyestuffs and as dyestuffs for acetate silk.

The following examples will further illustrate the nature of this invention but the invention is not restricted to these examples. The parts are by weight.

*Example 1*

40 parts of the monoamino-allo-ms-naphthodianthrone obtainable by reduction of the nitro compound produced by treating allo-ms-naphthodianthrone in nitrobenzene with strong nitric acid, are dissolved in 1350 parts of concentrated sulphuric acid and are heated slowly to from 110° to 120° centigrade while stirring after the addition of 24 parts of nitrobenzene and 65 parts of glycerine. When a sample taken out is found to yield a red dyeing fast to chlorine the whole is allowed to cool, poured into water, filtered by suction, washed until neutral and dried. The pyridino-allo-ms-naphthodianthrone thus obtained is a brown red powder which dissolves in concentrated sulphuric acid with a green coloration and gives a red violet vat from which cotton is dyed powerful red shades of good fastness. It crystallizes in the form of red needles which melt at from 350° to 352° centigrade.

*Example 2*

10 parts of the pyridino-allo-ms-naphthodianthrone obtainable according to Example 1 are dissolved in 150 parts of concentrated sulphuric acid. 10 parts of pyrolusite are then introduced while stirring, and the green color of the solution changes to blue violet, the solution becoming hot at the same time.

When the reaction is completed the whole is filtered by suction, the filtrate is poured onto ice and worked up in the usual manner. The pyridino-ms-anthradianthrone thus obtained is a brown powder which crystallizes in the form of orange needles and yields powerful orange dyeings of excellent fastness on cotton from a blue violet vat.

A product having similar tinctorial properties is obtained from monoamino-ms-anthradianthrone by treatment in sulphuric acid with glycerine in tthe presence of copper salts and nitrobenzene.

*Example 3*

84 parts of diamino-allo-ms-naphthodianthron are dissolved in 2700 parts of sulphuric acid, and 120 parts of nitrobenzene and 250 parts of glycerine, are then added. The mixture is then heated to from 100° to 120° centigrade while stirring until the reaction is completed. The whole is then poured onto ice and filtered by suction. The red brown product obtained dissolves in concentrated sulphuric acid giving a green coloration and dyes cotton beautiful bluish red shades from a Bordeaux red vat. The dyestuff crystallizes from nitrobenzene in the form of beautiful crystals and forms readily crystallizable salts with acids, as for example with sulphuric acid. The solution of the dyestuff in sulphuric acid may be oxidized with pyrolusite to a derivative of ms-anthradianthrone.

*Example 4*

42 parts of monoaminopyranthrone (obtainable for example from pyranthrone by nitration in nitrobenzene with very concentrated nitric acid at from 80° to 100° centigrade and reduction of the nitro compound thus obtained with sodium sulphide) are dissolved in 1000 parts of concentrated sulphuric acid while stirring. After the addition of 24 parts of nitrobenzene and 65 parts of glycerine the whole is heated to from 110° to 115° centigrade and kept at this temperature until the reaction is completed, which may readily be ascertained by the decrease of the internal temperature which rises during the reaction. The whole is then worked up in the usual manner. The pyridinopyranthrone thus obtained in excellent yields in the form of a red brown powder dissolves in concentrated sulphuric acid giving a blue coloration, crystallizes from organic solvents of high boiling point in the form of red brown needles which melt above 300° centigrade and gives very powerful blue red dyeings of very good fastness on the vegetable fibre from a violet red vat.

If necessary the crude dyestuff may be purified by way of its oxonium or ammonium salts or by treatment with oxidizing agents as for example in the form of its aqueous paste with hypochlorites.

A chloropyridinopyranthrone having similar tinctorial properties to the last mentioned dyestuff free from chlorine is obtained in an analogous manner from aminochloropyranthrone.

*Example 5*

34 parts of diaminoanthanthrone (obtainable by reduction of the reaction products produced by nitrating anthanthrone in very concentrated nitric acid at room temperature) are dissolved in 780 parts of concentrated sulphuric acid and after the addition of 60 parts of nitrobenzene and 130 parts of glycerine the whole is heated to from 110° to 130° centigrade while stirring. The whole is kept at this temperature until a sample taken out is found to yield a pure yellow dyeing after working up. The whole is then allowed to cool and is worked up in the usual manner. The dipyridinoanthanthrone thus obtained in the form of a yellow brown powder dissolves in concentrated sulphuric acid giving an orange coloration, crystallizes in the form of yellow needles and dyes cotton powerful yellow shades of very good fastness from a red violet vat.

The monopyridino derivative which yields somewhat more greenish yellow dyeings is obtained in a similar manner from monoaminoanthanthrone.

*Example 6*

69 parts of monoamino-3.4.8.9-dibenzopyrene-5.10-quinone are dissolved in 2000 parts of sulphuric acid while stirring and after the addition of 50 parts of nitrobenzene and 120 parts of glycerine the whole is heated slowly to from 110° to 120° centigrade. As soon as a sample taken out and worked up yields a pure yellow dyeing fast to chlorine, the whole is allowed to cool and is worked up in the usual manner. The pyridino-3.4.8.9-dibenzopyrene-5.10-quinone thus obtained in the form of a brown yellow powder crystallizes from nitrobenzene in the form of yellow needles, dissolves in concentrated sulphuric acid giving a red violet coloration and dyes cotton very fast orange yellow shades from a red violet vat.

A dipyridino - 3.4.8.9 - dibenzopyrene-5.10-quinone is obtained in an analogous manner from diaminodibenzopyrenequinone.

Monoamino-4.5.8.9-dibenzopyrene-3.10-quinone when treated as described in this example, yields a reaction product which gives red brown dyeings.

*Example 7*

84 parts of amino-allo-ms-naphthodianthrone and 120 parts of glycerine are heated to from 120° to 130° centigrade in 2000 parts of sulphuric acid until a sample taken out yields a red dyeing fast to chlorine on cotton. The whole is then poured onto ice and filtered by suction. The product thus obtained is identical with that obtained according to Example 1.

*Example 8*

90 parts of nitro-allo-ms-naphthodianthrone, and 120 parts of glycerine are heated to from 140° to 150° centigrade in from 1500 to 2000 parts of sulphuric acid until a sample taken out is found no longer to contain unchanged initial material. The whole is then allowed to cool, is poured onto ice and filtered by suction. The product thus obtained is identical with that obtained according to Examples 1 and 7.

*Example 9*

94 parts of Bz-dichloro-4-amino-anthraquinone-2.1-benzacridone are poured into 2000 parts of sulphuric acid and after the addition of 60 parts of nitrobenzene and 100 parts of glycerine the mixture is slowly heated to from 110° to 130° centigrade while stirring. The whole is kept at this temperature until the reaction is completed, which may be ascertained by the decrease of the internal temperature. The whole is then worked up in the usual manner. The 4.3-pyridino-Bz-dichloroanthraquinone-2.1-benzacridone obtained in very good yields which corresponds to the formula:

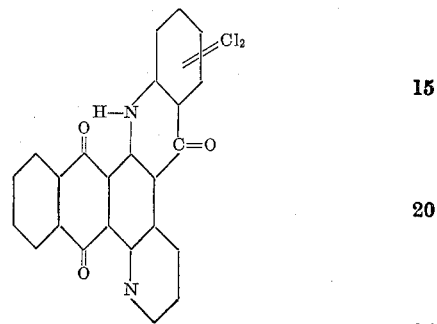

crystallizes in the form of violet needles, dissolves in concentrated sulphuric acid giving an orange coloration and dyes cotton comparatively weak violet shades from a violet vat.

*Example 10*

100 parts of the dipyridino-anthanthrone obtainable according to Example 5, are dissolved in 300 parts of sulphuric acid monohydrate, and 50 parts of water are allowed to run in while stirring, the reaction mixture then being allowed to cool and the oxonium sulphate separating out in the form of yellow needles is filtered off, washed with a little sulphuric acid of 80 per cent strength and decomposed by means of hot water. The dyestuff is filtered off and obtained in crystalline form and dyes cotton purer golden orange shades than the crude dyestuff. All other crude dyestuffs obtainable according to the present invention may be purified in an analogous manner.

*Example 11*

36 parts of di-amino-3.4.8.9-dibenzopyrene-5.10-quinone (obtainable by reduction of the corresponding dinitro compound which may be produced by the action of nitric acid of 96 per cent strength on 3.4.8.9-dibenzopyrene-5.10-quinone at between 20° and 30° centigrade) are dissolved in 750 parts of concentrated sulphuric acid, and 350 parts of glycerine and 18 parts of nitrobenzene are added to the reaction mixture which is then heated at between 110° to 120° centigrade for 1½ hours. The reaction mixture is then poured onto ice, the precipitate filtered off, washed until neutral and boiled for a short time with an alkali metal hypochlorite. The dipyridinodibenzopyrenequinone obtained crystallizes from solvents of high boiling point, as for example trichlorobenzene, dissolves in concentrated sulphuric acid to give a red solution and dyes cotton from a red vat brown yellow shades.

*Example 12*

50 parts of the diaminoanthanthrone specified in Example 5 are dissolved in 1000 parts of concentrated sulphuric acid, the solution being then diluted with 100 parts of water. 30 parts of 1-nitrobenzene-3-sulphonic acid and 50 parts of glycerine are added to the said solution which is then warmed to about 120° centigrade. By the reaction taking place, the temperature of the reaction mixture rises to between about 140° and 150° centigrade. The reaction mixture is allowed to cool, poured onto ice, the precipitate filtered off and washed until neutral. The reaction product is precipitated by warming it for a short time with a solution of sodium hypochlorite whereby the color of the product is considerably brightened. It is identical with the dipyridinoanthanthrone described in Example 5.

Example 13

23 parts of the pyridino-allo-ms-naphthodianthrone obtainable according to Example 1 are heated to 160° centigrade while stirring in 300 parts of nitrobenzene after the addition of 1 part of iodine and 1 part of iron. 50 parts of bromine are allowed to flow in at the same temperature and the whole is stirred until bromine is no longer taken up. The whole is then allowed to cool and the tetrabromopyridino-allo - ms - naphthodianthrone is obtained in an excellent yield in the form of blue red needles which is filtered off by suction. It dissolves in concentrated sulphuric acid with a green coloration, and gives a violet vat from which the vegetable fibre is dyed brilliant powerful blue red shades of good fastness.

Reaction products containing less bromine are obtained by working at lower temperatures and by employing less bromine.

A chlorine derivative giving clear brilliant red dyeings is obtained with sulphuryl chloride or chlorine in nitrobenzene.

The corresponding mixed halogen derivatives which give more or less blue or yellowish red dyeings are obtained from mono-chloro- or dichloro - pyridino-allo - ms - naphthodianthrones with bromine or iodine.

The halogenation may also be carried out in aqueous suspension or in the absence of solvents or suspending agents or halogen transferrers.

By halogenating pyridino-allo-ms-naphthodianthrone in acid media, as for example in chlorsulphonic acid, sulphuric acid, oleum, or in a melt of sodium chloride and aluminium chloride an oxidation to give the ms-anthradianthrone derivative frequently takes place in addition to the halogenaton. Thus for example by brominating in chlorsulphonic acid with 2 atomic proportions of bromine at higher temperatures while employing sulphur as a catalyst, dibromopyridino-ms-anthradianthrone is obtained which dissolves in concentrated sulphuric acid with a blue coloration, and gives a blue violet vat from which orange red dyeings of excellent fastness are obtained.

Example 14

5 parts of the pyridino-allo-ms-naphthodianthrone obtainable according to Example 1 are suspended in 120 parts of nitrobenzene heated to from 85° to 95° centigrade, from 4 to 5 parts of very concentrated nitric acid being then added. The whole is then stirred for about 2 hours at the same temperature and is then allowed to cool and is worked up in the usual manner. The nitro-pyridino-allo-ms-naphthodianthrone thus obtained is a red powder which crystallizes from nitrobenzene in the form of red needles, dissolves in concentrated sulphuric acid giving a green coloration and yields a violet vat from which cotton is dyed grey green shades.

Higher nitrated pyridino-allo-ms-naphthodianthrones are obtained at higher temperatures, particularly readily when larger amounts of nitric acid and smaller amounts of nitrobenzene are employed. The corresponding amino compounds are obtained from the nitro compounds by reduction, as for example with sodium sulphide.

The nitration may also be carried out in inorganic solvents or suspending agents or in the absence of solvents or suspending agents.

Example 15

460 parts of pyridinopyranthrone obtainable according to Example 4 are dissolved while stirring in 4000 parts of chlorsulphonic acid, and after the addition of 40 parts of sulphur and 200 parts of bromine the whole is heated slowly to from 60° to 65° centigrade. The whole is kept at the same temperature until all the bromine has been taken up; it is then allowed to cool and it is worked up in the usual manner. The dibromopyridinopyranthrone obtained in the form of a wine red paste dissolves in concentrated sulphuric acid with a blue coloration and gives a violet vat from which the vegetable fibre is dyed clear powerful Bordeaux red shades of very good fastness.

A monobromo derivative is obtained by employing only 1 atomic proportion of bromine, and higher brominated products are obtained by employing more than 2 atomic proportions of bromine.

The bromination may also be carried out in organic solvents as for example in nitrobenzene.

The corresponding chloro-derivatives of the corresponding chlorobromo, chloroiodo, bromoiodo and iodo derivatives are obtained in an analogous manner.

Example 16

25 parts of pyridino-anthanthrone (obtainable according to the second paragraph of Example 5) are dissolved in 360 parts of chlorsulphonic acid, 35 parts of bromine being introduced after the addition of 3 parts of iodine to the said solution. The reaction mixture is warmed for from 5 to 6 hours at betwen 60° and 65° centigrade, then allowed to cool, diluted with sulphuric acid monohydrate and poured onto ice. The reaction product, a dibromopyridinoanthanthrone, dissolves in concentrated sulphuric acid to give a red solution, and dyes cotton orange yellow shades fast to chlorine from a red violet vat.

Example 17

9 parts of pyridino-ms-anthradianthrone (obtainable according to Example 2) are dissolved in 270 parts of chlorsulphonic acid, and chlorine is passed for several hours into the said solution warmed to between 60° and 65° centigrade after the addition of 1 part of iodine. The coloration of the solution changes from violet to blue. The reaction mixture is then allowed to cool, diluted with sulphuric acid monohydrate, poured onto ice and the precipitate filtered off. The product, a hexa-chloro-pyridino - ms - anthradianthrone dyes cotton red orange shades from a blue vat.

Example 18

20 parts of the pyridino-ms-anthradianthrone specified in the foregoing example are dissolved in 360 parts of chlorsulphonic acid, 30 parts of bromine being then slowly introduced into the said solution after the addition of 3 parts of iodine. The reaction mixture is warmed for from 4 to 5 hours at between 65° and 70° centigrade, allowed to cool, diluted with sulphuric acid monohydrate and poured onto ice. The dibromopyridino-ms-anthradianthrone thus obtained dissolves in concentrated sulphuric acid to give a blue solution, is only sparingly soluble in organic solvents of high boiling point, such as for example nitrobenzene, and dyes cotton very fast orange shades from a blue vat.

A similar product is obtained by acting on the said pyridino-ms-anthradianthrone suspended in nitrobenzene with bromine at elevated temperatures in the presence of halogenating catalysts.

*Example 19*

100 parts of monoaminoanthanthrone are dissolved in 700 parts of sulphuric acid whereupon 35 parts of nitrobenzene-sulphonic acid, 55 parts of glycerine and 40 parts of water are added, whereupon the whole is warmed at between 100° and 105° C. until a sample furnishes orange dyeings from the vat. Then about 100 parts of water are run in and the whole is allowed to cool. A very good yield of monopyridinoanthanthrone separates as sulphate in good crystallized form. It is filtered off and decomposed by means of water. The monopyridinoanthanthrone thus obtained dissolves in sulphuric acid to give a red solution and dyes cotton from a violet alkaline hydrosulphite vat beautiful golden orange shades of excellent fastness against light and chlorine.

The dyestuff may be halogenated in any usual manner whereby as a rule orange dyeing products are obtained.

*Example 20*

60 parts of the product obtained according to the foregoing example are dissolved while cooling in 225 parts of 95 per cent nitric acid. After some time 120 parts of water are dropped in while stirring, whereupon the nitric acid salt of mononitromonopyridinoanthanthrone separates out in beautiful yellow crystals which are filtered off, washed with dilute nitric acid, the nitrate then being decomposed by triturating it with water. The mononitromonopyridinoanthanthrone crystallizes from nitrobenzene in orange brown needles and dissolves in sulphuric acid to give a red solution. It may be converted into the corresponding amino derivative by reduction.

*Example 21*

5 parts of monopyridino-3.4.8.9-dibenzopyrene-5.10-quinone are suspended in 200 parts of nitrobenzene whereupon 9 parts of bromine are introduced at 120° C. after the addition of 1 part of iron and 0.1 part of iodine. The reaction mixture is heated to between 150° and 160° C. and kept thereat for about one hour. After cooling the monobromomonopyridino-3.4.8.9-dibenzopyrene-5.10-quinone is filtered off. It dissolves in sulphuric acid to give a red violet solution and dyes cotton clear orange yellow shades from a red violet vat.

A similar product is obtained by brominating the said initial material in chlorosulphuric acid in the absence of catalysts such as iron or iodine.

*Example 22*

5 parts of monoamino-allo-ms-naphthodianthrone are dissolved in about 200 parts of concentrated phosphoric acid at 120° C. From 3 to 4 parts of nitrobenzene and 6 parts of glycerine are then added to the solution which is heated for a short time to between 180° and 190° C. After cooling the reaction mixture is poured onto ice and worked up as usual. The pyridino derivative thus obtained may be recrystallized from nitrobenzene.

*Example 23*

5 parts of nitrobenzenesulphonic acid and 10 parts of epichlorhydrine are introduced into a solution of 10 parts of diaminoanthanthrone in 150 parts of sulphuric acid. The reaction mixture is heated at between 120° and 130° C. for one hour, then poured after cooling onto ice and worked up as usual. The reaction product is dipyridinoanthanthrone and identical with the product obtained according to Example 5.

*Example 24*

50 parts of diaminoanthanthrone are dissolved in 1000 parts of sulphuric acid. After the addition of 150 parts of the sodium salt of nitrobenzenesulphonic acid, 70 parts of water and 60 parts of glycerine the reaction mixture is carefully heated at between about 100 and 110° C. until the pulp-like reaction mixture becomes a homogeneous liquid which is the case after about one to two hours. The reaction mixture is then poured into water, the reaction product filtered off, washed neutral and treated with a solution of sodium hypochlorite while warming. In order to further purify the amorphous dyestuff thus obtained it is introduced into from 4 to 6 times the amount of 65 per cent nitric acid and heated for some time to between about 60° and 80° C., whereby it is converted into a yellow beautiful crystallizing nitrate. The crystalline pulp is filtered off, washed with dilute nitric acid and the nitrate decomposed in the usual manner.

The purification may also be carried out by dissolving the reaction product treated with sodium hypochlorite in highly concentrated nitric acid while cooling and then allowing water to run in until the strength of the nitric acid is between about 60 and 65 per cent whereupon a crystalline product separates out. A similar purification is also effected without any pretreatment by treating the crude product with larger amounts of warmed nitric acid.

*Example 25*

5 parts of monopyridinopyranthrone are dissolved in 100 parts of concentrated sulphuric acid and treated while cooling with a mixture of 7 parts of 95 per cent nitric acid and 20 parts of sulphuric acid. The coloration of the solution turns from blue to red. After stirring for about one hour the reaction mixture is poured onto ice and filtered. The nitromonopyridino-pyranthrone thus obtained is a brown powder dyeing cotton from a violet red vat blue grey shades which turn to brown by the action of chlorine.

*Example 26*

10 parts of the dipyridinoanthanthrone obtainable according to Example 5 are heated to boiling in 100 parts of trichlorobenzene after the addition of 1 part of iodine while passing chlorine into the reaction mixture until a sample furnishes brilliant red orange shades on cotton. The reaction mixture is then allowed to cool and the reaction product separated in the form of orange red crystals filtered off. It crystallizes in needles from solvents of high boiling point in which it is very difficultly soluble, furnishes a violet vat and dissolves in concentrated sulphuric acid to give a blue red solution.

A similar reaction product is obtained by treating the aforesaid initial material with sulphuryl chloride in the presence of iodine in the absence of any solvent.

What we claim is:—

1. Vattable dipyridino-anthanthrones which may be halogenated.

2. Vattable halogenated dipyridino-anthanthrones.

3. Vattable chlorinated dipyridino-anthanthrones.

4. Halogenated monopyridino-pyranthrones.

5. Vattable pyridino compounds of vat dyestuffs containing a pyrene ring in their molecule which may contain 1 to 6 halogen atoms.

6. Vattable pyridino compounds of vat dyestuffs which contain the pyrene ring and which have the vattable groups in an isocyclic ring attached to the pyrene ring which may contain 1 to 6 halogen atoms.

7. Vattable pyridino compounds of dibenzoylenepyrenes corresponding to the general formula:

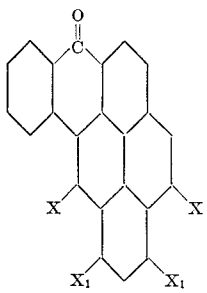

wherein the second benzoylene group

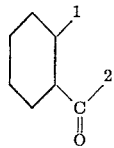

is connected to $X$ and $X_1$ through bonds 1 and 2, respectively, the remaining $X$ and $X_1$ being hydrogen which dibenzoylenepyrenes may contain 1 to 4 halogen atoms.

8. Vattable pyridino compounds of vat dyestuffs containing the pyrenequinone ring which may contain 1 to 2 halogen atoms.

9. Pyridinoanthanthrones which may contain 1 to 2 pyridine rings and 1 to 2 halogen atoms.

10. Dipyridinoanthanthrones which may contain 1 to 2 halogen atoms.

11. Pyridinopyranthrone being a red brown powder dissolving in concentrated sulfuric acid giving a blue coloration crystallizing in red brown needles which melt above 300° C. dyeing vegetable fibres powerful blue red shades from a violet red vat.

12. The process of producing vattable high-molecular pyridino compounds which comprises condensing a vat dyestuff which contains a pyrene ring, an amino group and a free ortho position to the amino group with glycerine in an acid selected from the group consisting of sulfuric and phosphoric acid in the presence of a dehydrogenating agent.

MAX ALBERT KUNZ.
KARL KOEBERLE.
GERD KOCHENDOERFER.